(12) United States Patent
Ishitobi

(10) Patent No.: US 8,639,893 B2
(45) Date of Patent: Jan. 28, 2014

(54) INFORMATION PROCESSING APPARATUS, INFORMATION PROCESSING METHOD, AND COMPUTER READABLE MEDIUM STORING PROGRAM

(75) Inventor: Yasuhiro Ishitobi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 184 days.

(21) Appl. No.: 13/220,400

(22) Filed: Aug. 29, 2011

(65) Prior Publication Data

US 2012/0173828 A1 Jul. 5, 2012

(30) Foreign Application Priority Data

Jan. 5, 2011 (JP) .................................. 2011-000312

(51) Int. Cl.
*G06F 13/14* (2006.01)

(52) U.S. Cl.
USPC .......................................... 711/156; 711/154

(58) Field of Classification Search
None
See application file for complete search history.

(56) References Cited

U.S. PATENT DOCUMENTS

2009/0119466 A1* 5/2009 Gower et al. .................. 711/154
2009/0265462 A1* 10/2009 Tajiri ............................. 709/224
2011/0283045 A1* 11/2011 Krishnan et al. .............. 711/102

FOREIGN PATENT DOCUMENTS

| JP | 05-174060 A | | 7/1993 | |
| JP | 2006-277581 | * | 10/2006 | .............. G06F 17/21 |
| JP | 2006-277581 A | | 10/2006 | |

* cited by examiner

*Primary Examiner* — Than Nguyen
(74) *Attorney, Agent, or Firm* — Sughrue Mion, PLLC

(57) ABSTRACT

An information processing apparatus includes an operation detector that detects an operation performed on information, a history memory controller that controls a history memory such that the history memory stores as history information an operator and information, serving as an operation target, in a mapped state if the operation detector has detected the operation, an extractor that extracts from the history memory an operator having performed the operation if the operation detector has detected the operation, and a notifier that notifies the operator extracted by the extractor that the operation has been performed on the information.

20 Claims, 13 Drawing Sheets

| OPERATION TYPE | OPERATOR | OPERATION TARGET | TIME AND DATE OF OPERATION | ... |
|---|---|---|---|---|
| ... | ... | ... | ... | ... |
| NEW REGISTRATION | Mary | Doc-00005 | 2010/09/10 15:13:01 | |
| ... | ... | ... | ... | ... |
| REFERENCE START | Tom | Doc-00001 | 2010/09/10 17:20:11 | ... |
| REFERENCE END | Tom | Doc-00001 | 2010/09/10 17:20:15 | ... |
| REFERENCE START | Tom | Doc-00005 | 2010/09/10 17:21:21 | ... |
| REFERENCE END | Tom | Doc-00005 | 2010/09/10 17:30:25 | ... |
| ... | ... | ... | ... | ... |
| REFERENCE START | Mike | Doc-00005 | 2010/09/10 18:01:31 | ... |
| VERSION ADDITION | Mary | Doc-00005 | 2010/09/10 18:05:41 | ... |
| ... | ... | ... | ... | ... |

| OPERATION TYPE | OPERATOR | OPERATION TARGET | TIME AND DATE OF OPERATION | |
|---|---|---|---|---|
| ... | ... | ... | ... | ... |
| NEW REGISTRATION | Mary | Doc-00005 | 2010/09/10 15:13:01 | ... |
| ... | ... | ... | ... | ... |
| REFERENCE START | Tom | Doc-00001 | 2010/09/10 17:20:11 | ... |
| REFERENCE END | Tom | Doc-00001 | 2010/09/10 17:20:15 | ... |
| REFERENCE START | Tom | Doc-00005 | 2010/09/10 17:21:21 | ... |
| REFERENCE END | Tom | Doc-00005 | 2010/09/10 17:30:25 | ... |
| ... | ... | ... | ... | ... |
| REFERENCE START | Mike | Doc-00005 | 2010/09/10 18:01:31 | ... |
| VERSION ADDITION | Mary | Doc-00005 | 2010/09/10 18:05:41 | ... |
| ... | ... | ... | ... | ... |

| USER ACCOUNT | NOTIFICATION DESTINATION INFORMATION | ... |
|---|---|---|
| Tom | tom@domain.com | ... |
| Mike | mike@domain.com | ... |
| ... | ... | |

FIG. 8

| USER ACCOUNT | OPERATION TYPE |
|---|---|
| Tom | NEW REGISTRATION, VERSION ADDITION, REFERENCE START |
| Mike | NEW REGISTRATION |
| ... | ... |

FIG. 14

| OPERATION TARGET | PERIOD |
|---|---|
| Doc-00001 | SIX MONTHS |
| Doc-00005 | THREE MONTHS |
| ... | ... |

From: <DOCUMENT MANAGEMENT SYSTEM ADMINISTRATOR>
To: tom@domain.com
Subject: NOTICE OF DOCUMENT UPDATE DOCUMENT (Doc-00005) YOU REFERENCED 2010/09/10 17:21
WAS UPDATED BY USER (Mary) 2010/09/10 18:05.
RETRIEVE UPDATED DOCUMENT AS APPROPRIATE.

INFORMATION PROCESSING APPARATUS, INFORMATION PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-000312 filed Jan. 5, 2011.

BACKGROUND (i) Technical Field

The present invention relates to an information processing apparatus, an information processing method, and a computer readable medium storing a program.

(ii) Related Art

Techniques for notifying users of a modification of information are available.

SUMMARY

According to an aspect of the invention, there is provided an information processing apparatus. The information processing apparatus includes an operation detector that detects an operation on information, a history memory controller that controls a history memory such that the history memory stores as history information an operator and information, serving as an operation target, in a mapped state if the operation detector has detected the operation, an extractor that extracts from the history memory an operator having performed the operation if the operation detector has detected the operation, and a notifier that notifies the operator extracted by the extractor that the operation has been performed on the information.

BRIEF DESCRIPTION OF THE DRAWINGS

Exemplary embodiments of the present invention will be described in detail based on the following figures, wherein:

FIG. 8 illustrates a data structure of a user account and operation type condition table;

FIG. 14 illustrates a data structure of an operation target and period condition table;

FIG. 15 illustrates a specific content of a notification mail; and

DETAILED DESCRIPTION

An exemplary embodiment of the invention is described below with reference to the drawings.

Figure 1:
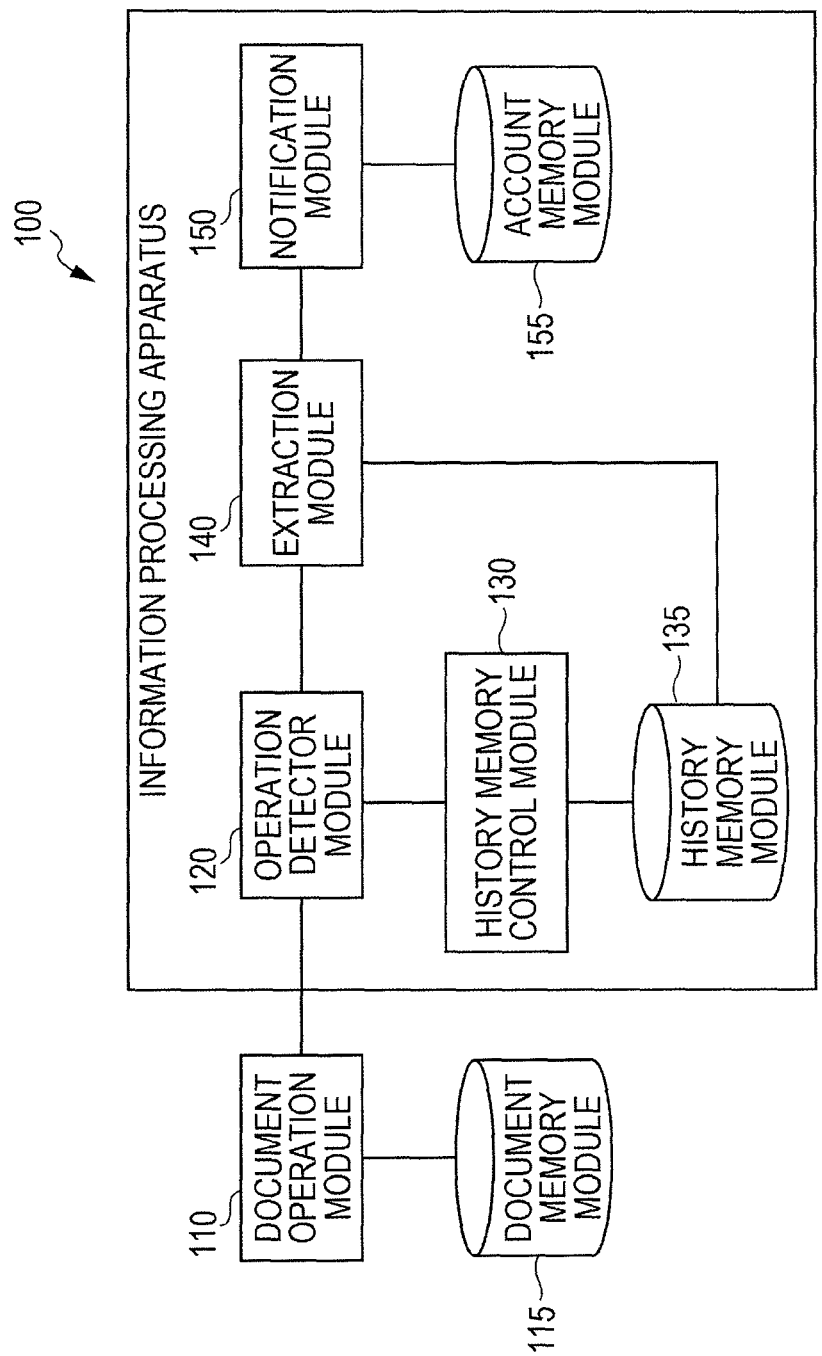
FIG. 1 illustrates a conceptual module configuration of an information processing apparatus of an exemplary embodiment.

FIG. 1 illustrates a conceptual module configuration of the exemplary embodiment. The word "module" refers to a generally logically separable software element (such as a computer program) or a component as a hardware element. The module of each exemplary embodiment refers to not only a module in a computer program but also a module in a hardware structure. The discussion of the exemplary embodiments also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If an exemplary embodiment is a computer program, these phrases are intended to express "causes a memory device to store information" or "controls a memory device to cause the memory device to store information." The modules may correspond to the functions in a one-to-one correspondence. In a software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, a "connection" refers to not only a physical connection but also a logical connection (such as an exchange of data, instructions, and data reference relationship). The word "predetermined" means that something is decided in advance of a process of interest. The word "predetermined" is thus intended to refer to something that is decided in advance of a process of interest in the exemplary embodiment. Even after a process in the exemplary embodiment has started, the word "predetermined" refers to something that is decided in advance of a process of interest depending on a condition or a status of the exemplary embodiment at the present point of time or depending on a condition or status heretofore continuing down to the present point of time.

The word "system" and the word "apparatus" refer to an arrangement where multiple computers, a hardware structure, and an apparatus are interconnected via a communication network (including a one-to-one communication connection). The word "system" and the word "apparatus" also refer to an arrangement that includes a single computer, a hardware structure, and an apparatus. The word "system" and the word "apparatus" have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are then written onto the memory device. A description of the reading of the information from the memory device prior to the process and the writing of the processed information onto the memory device subsequent to the process may be omitted as appropriate. The memory devices may include a hard disk, a random access memory (RAM), an external storage medium, a memory device connected via a communication line, and a register within a central processing unit (CPU).

An information processing apparatus 100 of an exemplary embodiment notifies users of an operation performed on information. As illustrated in FIG. 1, the information processing apparatus 100 includes operation detector module 120, history memory control module 130, history memory module 135, extraction module 140, notification module 150, and account memory module 155. The information processing apparatus 100 may further include document operation module 110 and document memory module 115.

The information refers to an operation target, and may include a document, and a folder. The document may be text data, digital data such as an image, a moving image, or sound, or a combination thereof. The document serves as a target of storage, editing, searching and the like. The document may be data exchanged by a particular unit between systems or between users. The document also includes any data similar to the data exchanged by the particular unit between systems or between users. The folder is also referred to as a directory. The folder is location information that specifies the mapping between a document and a location mapped to the document. In the discussion that follows, an example of the information is a document.

The document operation module 110 is connected to the document memory module 115 and the operation detector module 120. The document operation module 110 performs an operation on a document stored on the document memory module 115 in response to a user operation of a keyboard, a mouse, or a touchpanel. For example, the document operation module 110 may use a document production and editing program in a personal computer (PC) of a user, or may use a document production and editing program in a server that is connected via a communication line using a browser.

The document memory module 115, connected to the document operation module 110, stores a document. The document memory module 115 may be a server called a document database (DB), or may be a memory device in the PC of the user.

The operation detector module 120 is connected to the document operation module 110, the history memory control module 130, and the extraction module 140. The operation detector module 120 detects an operation performed on the document on the document memory module 115 by the document operation module 110. The types of detected operations include a new registration, a version addition (including a correction to the document), a reference start (operation for browsing, i.e., opening the document), a reference end (closing the document subsequent to the end of the browsing), a deletion, and a downloading. A predetermined operation type may be detected. The detection operation may be directly detecting an operation performed by the document operation module 110. The detection operation may be detecting an access that has been made to the document on the document memory module 115 in response to the operation performed by the document operation module 110. The detection operation may be detecting a modification in the document that has been examined by polling the document memory module 115 periodically or on an irregular basis.

The detection of the operation of the operation detector module 120 reveals the name of an operator that has done the operation, the type of the operation (hereinafter referred to as an operation type), the document as the target of the operation, the time and date of the operation (the time and date of the operation are not limited to time and date, but includes at least one of the year, the month, the day, the hour, the minute, the second, and the day of the week).

The history memory control module 130 is connected to the operation detector module 120 and the history memory module 135. If the operation detector module 120 has detected an operation, the history memory control module 130 controls the history memory module 135 such that the history memory module 135 stores, as history information (so-called log information), the name of the operator and the document as the operation target in a mapped state.

The history memory control module 130 may also control the history memory module 135 such that the history memory module 135 stores, as the history information, information related to operation time. The information related to the operation time may be a measured time period from the opening of the document to the closing of the document, the operation time and date, or operation start time and date and operation end time and date. In order to store the operation time and date, the history memory control module 130 controls the history memory module 135 such that the history memory module 135 also stores the operation type. The history memory control module 130 calculates the operation time by determining a difference between the operation time and date of the reference start of the document as the operation type and the operation time and date of the reference end of the document as the operation type. If the history memory control module 130 controls the history memory module 135 such that the history memory module 135 stores the operation start time and date and the operation end time and date, the operation time is calculated by determining the difference between the operation start time and date and the operation end time and date.

The history memory control module 130 may control the history memory module 135 such that the history memory module 135 stores as the history information the operation type or the operation time and date.

The history memory module 135 is connected to the history memory control module 130 and the extraction module 140. The history memory module 135 stores as the history information the operator and the document as an operation target in a mapped state.

The history memory module 135 may store as the history information the information related to the operation time.

The history memory module 135 may store as the history information the operation type or the operation time and date.

Figure 4:
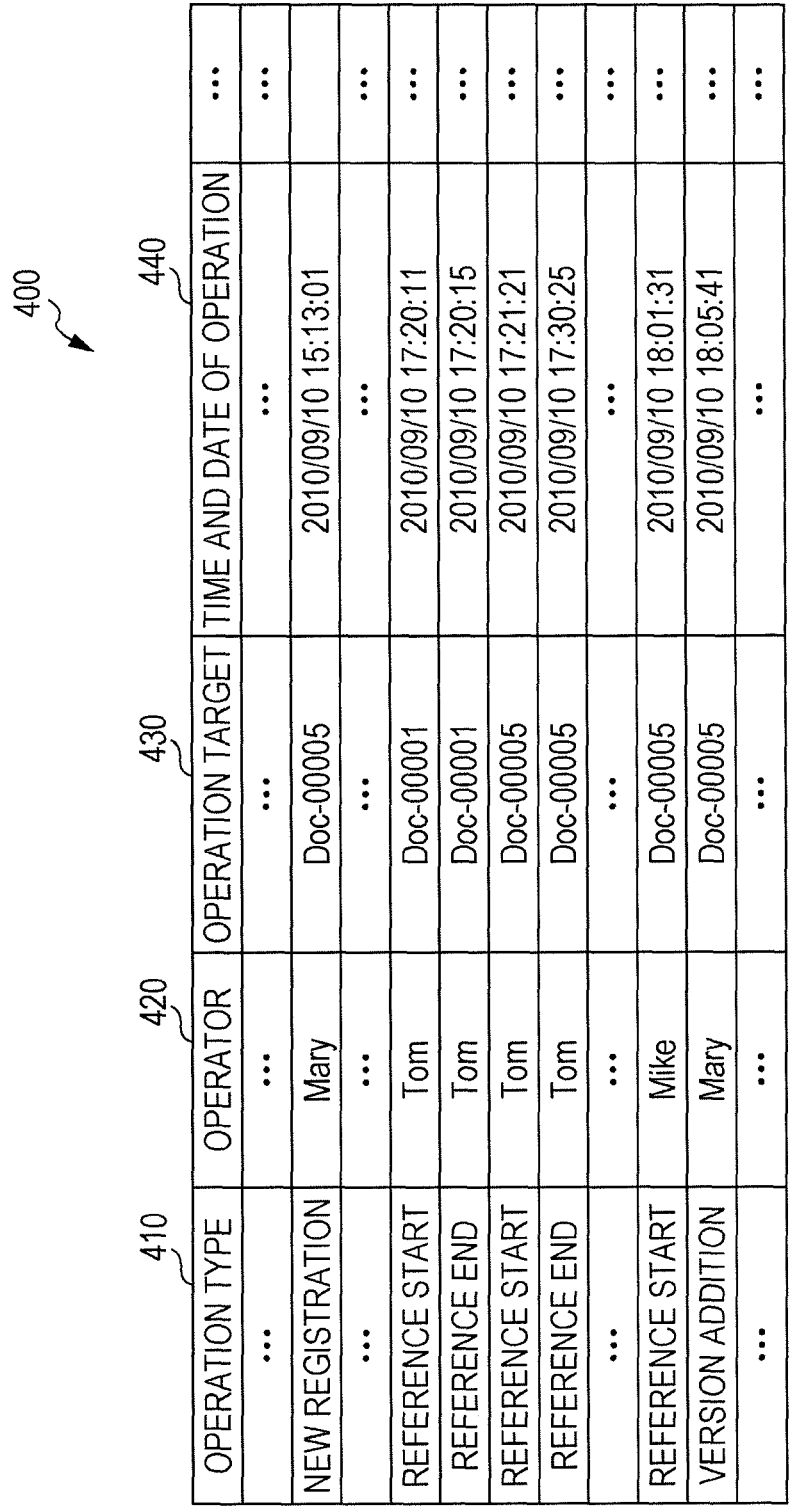
FIG. 4 illustrates a data structure of an operation history table.

The history memory module 135 may store an operation history table 400. FIG. 4 illustrates a data structure of the operation history table 400. The operation history table 400 includes operation type column 410, operator column 420, operation target column 430, and operation time and date column 440. The operation type column 410 lists an operation type detected by the operation detector module 120. The operator column 420 lists an operator that has performed the operation (operator identification information identifying the operator, such as an employee number). The operation target column 430 lists a document as an operation target (document identification information identifying the document, such as a document name, a uniform resource locator (URL)). The operation time and date column 440 lists operation time and date on which the operation is performed. The operation history table 400 includes the operation time and date column 440 listing the information related to the operation time. The operation history table 400 may simply include at least the operator column 420 and the operation target column 430. The operation history table 400 may include the operation type column 410, the operator column 420, and the operation target column 430. The operation history table 400 may include the operator column 420, the operation target column 430, and the operation time and date column 440. The operation history table 400 may also store information other than these pieces of information as the history information.

The extraction module 140 is connected to the operation detector module 120, the history memory module 135, and the notification module 150. If the operation detector module 120 has detected an operation, the extraction module 140 extracts from the history memory module 135 an operator that has performed an operation on the document. An operator, once having performed any operation on the document, becomes a notification destination if an operation is performed later on the document. In this case, the extraction module 140 may extract any operator that has performed an operation on the document within a predetermined period of time (for example, within one month or within one day) from the operation detected by the operation detector module 120.

The extraction module 140 may not extract an operator if the operator has an operation time equal to or shorter than a predetermined value on the document. For example, if the time from the reference start to the reference end is equal to or shorter than a predetermined value (for example, 5 seconds, and the operation is simply intended to check the content of the document only), the operator having performed the reference start and the reference end does not serve as a notification destination even if an operation is performed on the document later.

The extraction module 140 may extract an operator serving as a notification destination in accordance with the operation type predetermined on a per operator basis or in accordance with a period of the predetermined operation time and date. The predetermined operation type may be a condition applied to a preceding operation or a condition applied to a subsequent operation. An operator having performed an operation related to the operation type (such as a new registration) (for example, an operator having a predetermined operation type for notification) may be notified of an operation if any operation is performed later on the document. Conversely, an operator having performed any operation on the document (for example, an operator having a predetermined operation type for notification) may be notified of an operation only if the operation of a predetermined operation type (for example, a version addition) is performed later on the document. For example, if a period longer than a period of an ordinary operator is set as a period of the predetermined operation time and date for an operator serving as an administrator, that operator may be notified during the period longer than the ordinary operator.

The extraction module 140 may extract the operator as a notification destination in accordance with the operation type predetermined on a per document basis or in accordance with the period of the predetermined operation time and date. The predetermined operation type may be a condition applied to a preceding operation or a condition applied to a subsequent operation. An operator having performed an operation of a predetermined operation type (such as a new registration) on the document, the document having the predetermined operation type set, may be notified of the document if any operation is performed later on the document. Conversely, an operator having performed any operation to the document, the document having a predetermined operation type set, may be notified of the document only if the operation of the predetermined operation type (such as a version addition) is performed on the document. For example, a period, longer than periods set in the other documents, may be set in one document as a period of the predetermined operation time and date. An operator that has performed an operation on that document enjoys a longer period of notification about that document than the other documents.

The extraction module 140 may extract an operator as a notification destination in accordance with notification-free information predetermined on a per document basis. The notification-free information indicates whether notification is necessary or not. An operator that has performed an operation on a notification-free document is not notified of even if any operation is performed later on that document.

The period of the operation time and date on the extraction module 140 may be predetermined on a per operation type basis. For each operator or for each document, the extraction module 140 extracts an operator as a notification destination in accordance with the operation time and date predetermined on a per operation type basis. For example, an operator that has performed an operation of a predetermined operation type (such as a new registration) may be set to be an operator that is to enjoy a longer period of notification of that document than the other operators that have performed the operations of the other types (such as a reference start and a reference end) on that document.

The extraction module 140 stores conditions such as the predetermined values, the operation type, and the operation time and date. The conditions may be used singly or in combination. The predetermined operation type set as a condition may be an operation type set as a condition applied to a preceding operation, or may be an operation type set as a condition applied to an operation to be performed later.

The conditions may be set when the operator performs an operation on a document.

The extraction module 140 may not extract an operator of an operation detected by the operation detector module 120. More specifically, if the operator that has performed a preceding operation is identical to the operator that has performed a subsequent operation, the notification becomes unnecessary. The extraction module 140 does not extract the operator as the notification destination.

The notification module 150 is connected to the extraction module 140 and the account memory module 155. The notification module 150 notifies the operator extracted by the extraction module 140 that the operation has been performed on the document. The notification module 150 extracts a contact destination of the operator from the account memory module 155, and notifies the contact destination that the operation has been performed on the document. If the contact destination is a mail address, the notification module 150 sends an electronic mail indicating that the operation has been performed on the document.

A notification mail 1500 may be sent as illustrated in FIG. 15. FIG. 15 illustrates a specific content of the notification mail 1500. When operator Mary performs a version addition on document Doc-00005 in the operation history table 400 of FIG. 4, the notification mail 1500 is sent to operator Tom that has performed a reference start (reference end) on the document. The content of the notification is "Document Doc-00005 you referenced 2010/09/10 17:21 was updated by user (Mary) 2010/09/10 18:05. Retrieve updated document as appropriate." The content of the notification may include a history of operations performed by the operator as the notification destination.

Operator Mary has performed the new registration of the document Doc-00005. But the operator that has performed the version addition detected this time is also operator Mary, and the extraction module 140 does not set operator Mary as a notification destination.

If multiple past operations performed by the operator as the notification destination are present, one of the operations (for example, the latest operation) is selected, and the content of the notification may include the selected operation.

Figures 5, 6:
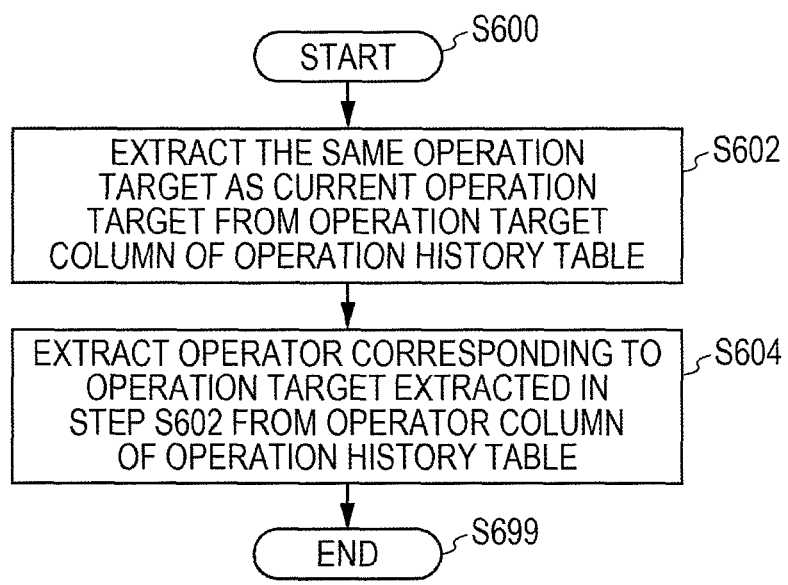
FIG. 5 illustrates a data structure of a notification destination information table.
FIG. 6 is a first flowchart of a process for extracting an operator as a notification destination.

The account memory module 155 is connected to the notification module 150. The account memory module 155 stores an operator and a contact destination of the operator in a mapped state. For example, the account memory module 155 stores a notification destination information table 500. FIG. 5 illustrates a data structure of the notification destination table 500. The notification destination table 500 includes a user account column 510 and a notification destination information column 520. The user account column 510 lists a user account (operator identification information). The notification destination information column 520 lists a contact destination of the user account. The contact destination may be a mail address, for example. Each user account may include multiple pieces of notification destination information.

Figure 2:
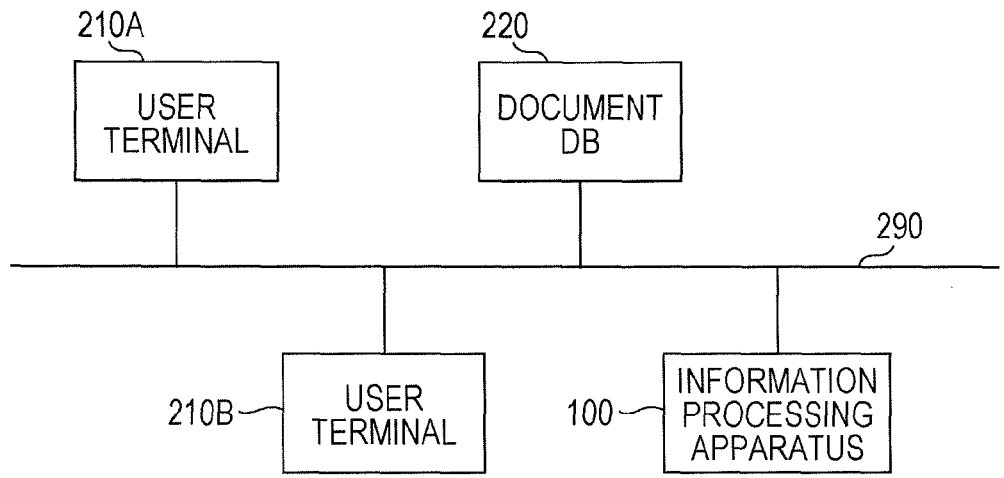
FIG. 2 illustrates a system configuration of the exemplary embodiment.

FIG. 2 illustrates a system configuration of the exemplary embodiment.

The information processing apparatus 100, user terminal 210A, user terminal 210B, and document database (DB) 220 are connected to each other via a communication line 290. The document operation module 110 of FIG. 1 is installed in each of the user terminal 210a and the user terminal 210B. The document storage module 115 of FIG. 1 is installed in the document DB 220. Each of the user terminal 210a and the user terminal 210B includes a keyboard, a mouse, a touch-panel, and the like. Using these elements, an operator performs an operation on a document on the document DB 220. The operation detector module 120 in the information processing apparatus 100 monitors documents on the user terminal 210a, the user terminal 210B, and the document DB 220 to detect any operation performed on the documents. These elements may be implemented as a document management system including the information processing apparatus 100 and the document DB 220. In such a case, the notification destination information table 500 described above registers the operator using the document management system.

Figure 3:
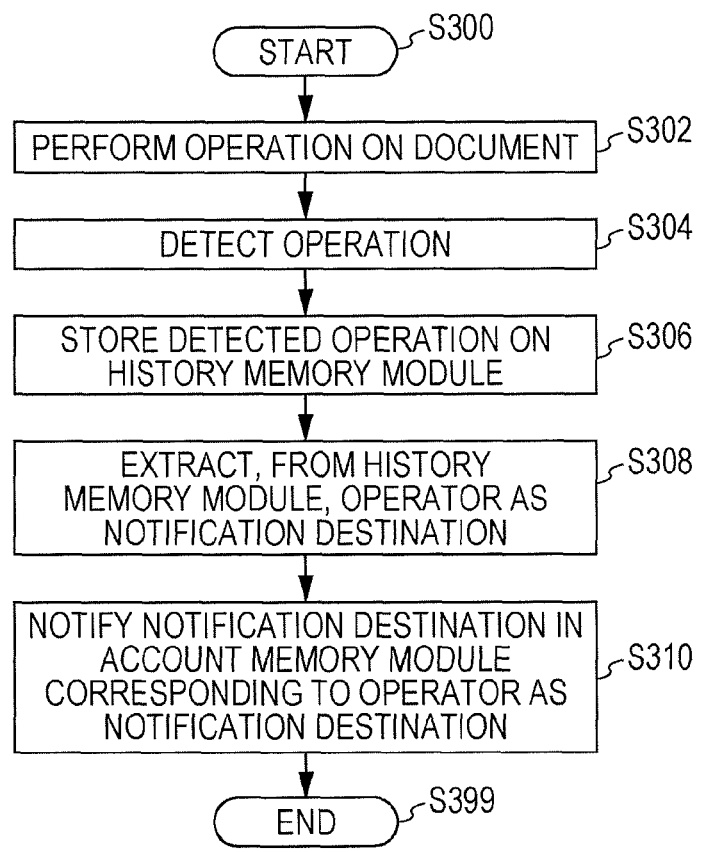
FIG. 3 is a flowchart of a process of the exemplary embodiment.

FIG. 3 is a flowchart of a process of the exemplary embodiment.

In step S302, the document operation module 110 performs an operation on a document on the document memory module 115.

In step S304, the operation detector module 120 detects the operation performed in step S302.

In step S306, the history memory control module 130 causes the history memory module 135 to store the operation detected in step S304.

In step S308, the extraction module 140 extracts an operator as a notification destination from the history memory module 135. The extraction process is described below with reference to flowcharts of FIGS. 6, 7, 9, 11, and 13. If the notification-free information indicating that no notification is needed is set in the document as an operation target, the operator may not be extracted.

In step S310, the notification module 150 notifies a notification destination in the account memory module 155 corresponding to the operator as the notification destination.

FIG. 6 is a first flowchart of an extraction process extracting the operator. The first flowchart of FIG. 6 is a detailed description of step S308 in the flowchart of FIG. 3 performed by the extraction module 140.

In step S602, the extraction module 140 extracts the same target as the current operation target (the operation target of the operation detected by the operation detector module 120) from the operation target column 430 of the operation history table 400.

In step S604, the extraction module 140 extracts the operator corresponding to the operation target extracted in step S602 from the operator column 420 of the operation history table 400. The extraction module 140 may not extract an operator if the operator has a reference time set for the operation target (a period from a reference start time and date to a reference end time and date) being equal to or shorter than a predetermined value.

Figure 7:
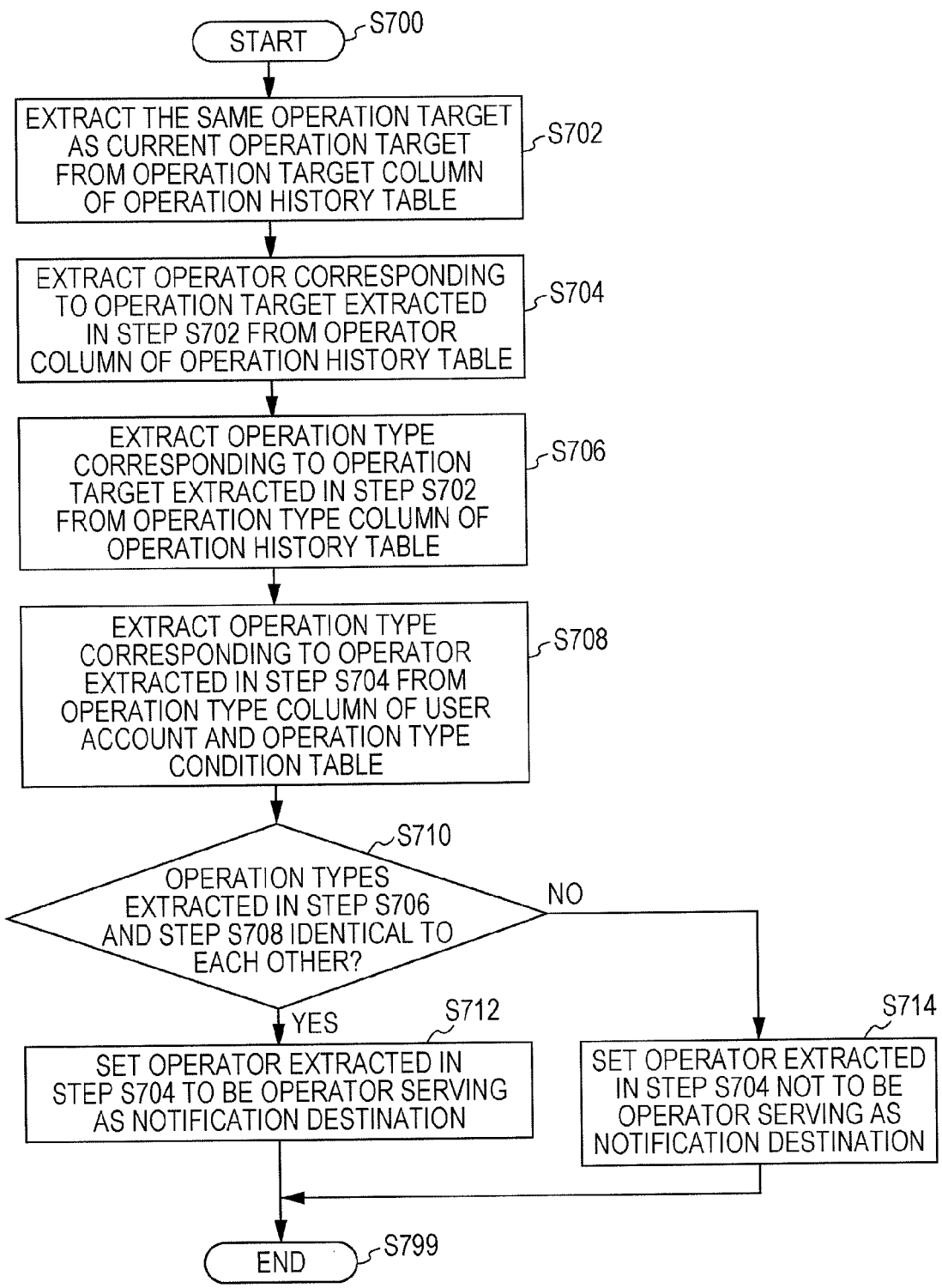
FIG. 7 is a second flowchart of the process for extracting the operator as the notification destination.

FIG. 7 is a second flowchart of a process for extracting an operator as a notification destination. The second flowchart of FIG. 7 is a detailed description of step S308 in the flowchart of FIG. 3 performed by the extraction module 140.

Operations in steps S702 and S704 are respectively identical to those in steps S602 and S604 in the flowchart of FIG. 6.

In step S706, the extraction module 140 extracts an operation type corresponding to the operation target extracted in step S702 from the operation type column 410 of the operation history table 400.

In step S708, the extraction module 140 extracts an operation type corresponding to the operator extracted in step S704 from an operation type column 820 of a user account and operation type condition table 800. The user account and operation type condition table 800 is stored on the extraction module 140. FIG. 8 illustrates a data structure of the user account and operation type condition table 800. The user account and operation type condition table 800 includes user account column 810 and operation type column 820. The user account column 810 lists a user account (operator identification information). The operation type column 820 lists an operation type. The operation type is a condition according to which an earlier operator is notified of any operation if the operation is performed on the same document after the earlier operator (stored on the user account column 810) performs the operation of the same operation type.

In step S710, the extraction module 140 determines whether the operation types extracted in steps S706 and S708 are identical to each other. If the operation types are identical to each other, processing proceeds to step S712. If not, processing proceeds to step S714.

In step S712, the extraction module 140 sets the operator extracted in step S704 to be an operator serving as a notification destination.

In step S714, the extraction module 140 sets the operator extracted in step S704 not to be an operator serving as a notification destination.

In the flowchart of FIG. 7, the operation type column 820 of the user account and operation type condition table 800 is a condition on a preceding operation. Alternatively, the operation type column 820 may be a condition on a subsequent operation. In such a case, step S706 becomes unnecessary. In step S710, the extraction module 140 determines whether the operation type of the operation (a subsequent operation) detected by the operation detector module 120 is identical to the operation type extracted in step S708. If the operation types are identical, processing proceeds to step S712. If not, processing proceeds to step S714.

Figure 9:
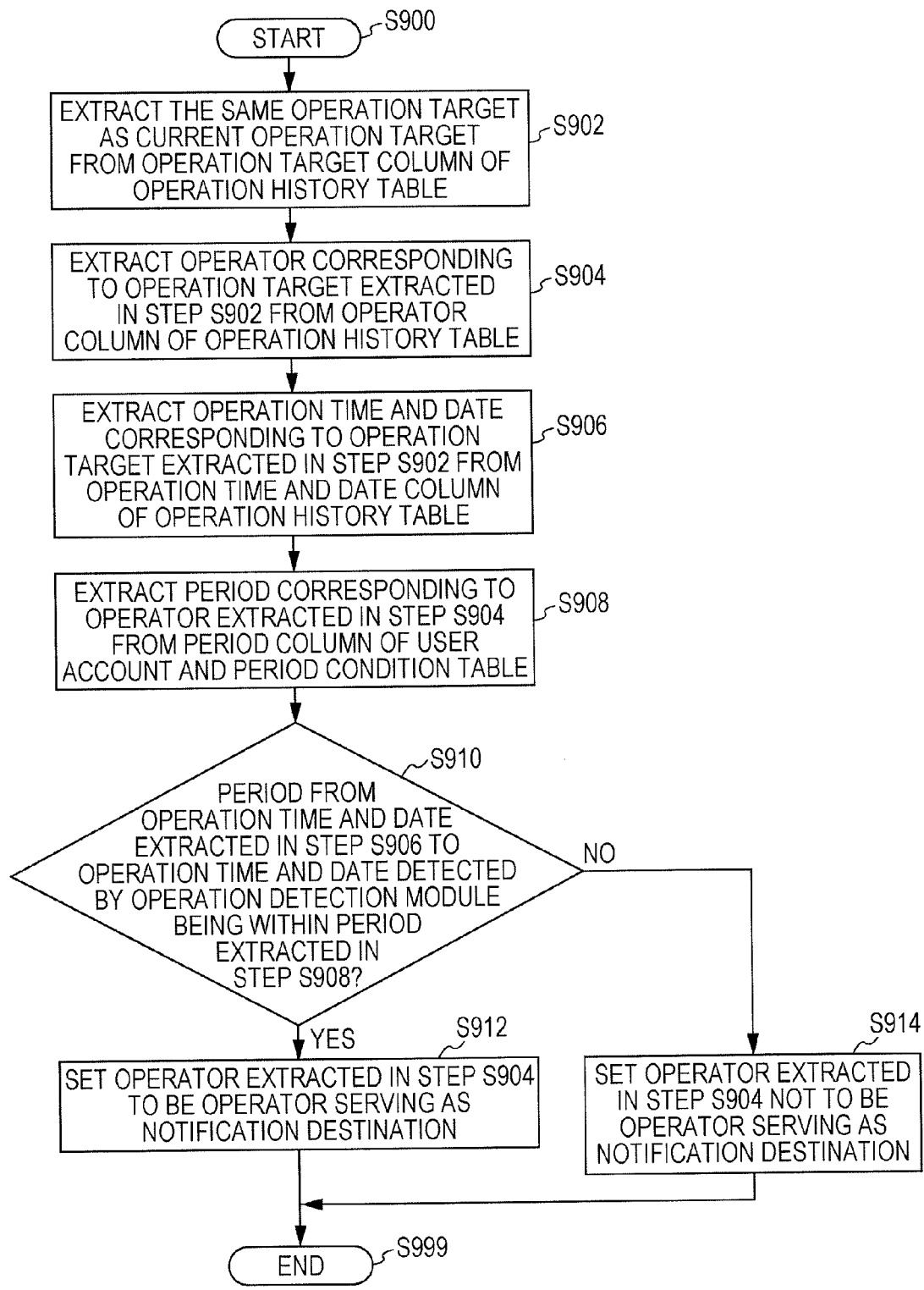
FIG. 9 is a third flowchart of the process for extracting the operator as the notification destination.

FIG. 9 is a third flowchart illustrating a process for extracting an operator as a notification destination. The third flowchart of FIG. 9 is a detailed description of step S308 in the flowchart of FIG. 3 performed by the extraction module 140.

Operations in steps S902 and S904 are respectively identical to those in steps S602 and S604 in the flowchart of FIG. 6.

In step S906, the extraction module 140 extracts operation time and date corresponding to the operation target extracted in step S902 from the operation time and date column 440 of the operation history table 400.

Figure 10:
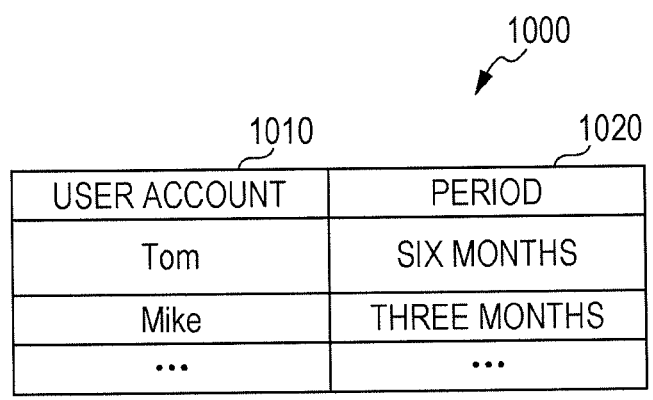
FIG. 10 illustrates a data structure of a user account and period condition table.

In step S908, the extraction module 140 extracts a period corresponding to the operator extracted in step S904 from a period column 1020 of a user account and period condition table 1000. The user account and period condition table 1000 is stored on the extraction module 140. FIG. 10 illustrates a data structure of the user account and period condition table 1000. The user account and period condition table 1000 includes user account column 1010 and period column 1020. The user account column 1010 lists a user account (operator identification information). The period column 1020 lists a period. The period is a condition according to which an earlier operator is notified of an operation if the operation is performed on the same document within that period from an operation performed by the earlier operator (stored on the user account column 1010).

In step S910, the extraction module 140 determines whether a period from an operation time and date extracted in step S906 to an operation time and date detected by the operation detector module 120 is within the period extracted in step S908. If the period is within the period extracted in step S908, processing proceeds to step S912. If not, processing proceeds to step S914.

In step S912, the extraction module 140 sets the operator extracted in step S904 to be an operator serving as a notification destination.

In step S914, the extraction module 140 sets the operator extracted in step S904 not to be an operator serving as a notification destination.

In the process of the flowchart of FIG. 9, the user account and period condition table 1000 storing the operator and the period mapped to the operator is used. Alternatively, a table storing an operator and a period of each operation type mapped to the operator may be used. In step S908 in such a case, the extraction module 140 extracts the operation type corresponding to the operation target extracted in step S902 from the operation type column 410 of the operation history table 400, and extracts the period of each operation type corresponding to the operator extracted in step S904 from the operation history table 400.

Figure 11:
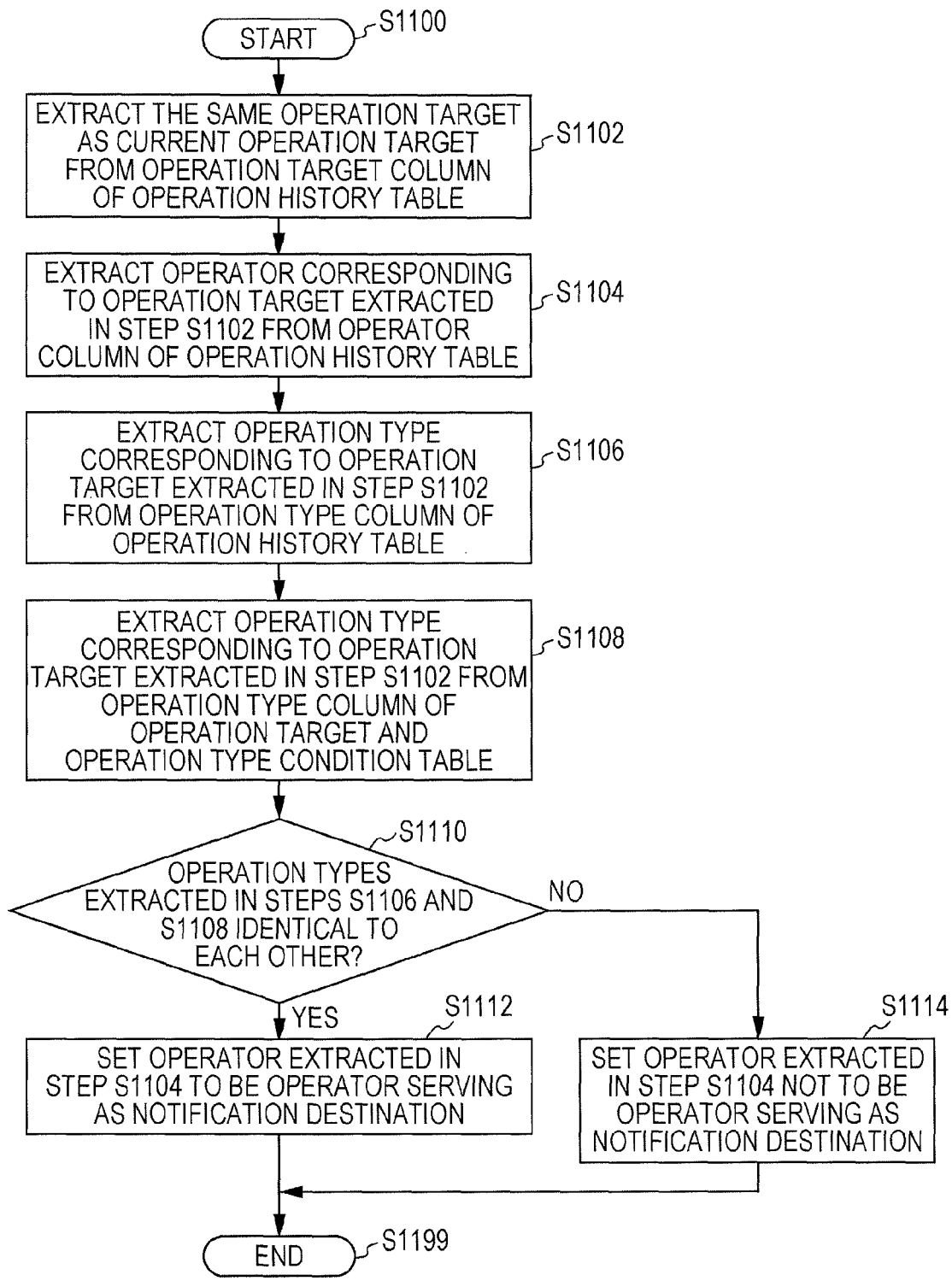
FIG. 11 is a fourth flowchart of the process for extracting the operator as the notification destination.

FIG. 11 is a fourth flowchart of a process for extracting an operator as a notification destination. The fourth flowchart of FIG. 11 is a detailed description of step S308 in the flowchart of FIG. 3 performed by the extraction module 140.

Operations in steps S1102 and S1104 are respectively identical to those in steps S602 and S604 in the flowchart of FIG. 6.

An operation in step S1106 is identical to the operation in step S706 in the flowchart of FIG. 7.

Figure 12:
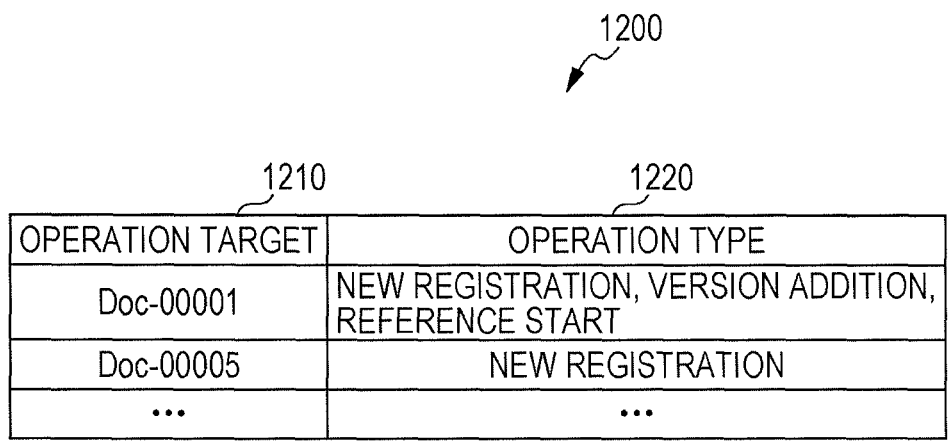
FIG. 12 illustrates a data structure of an operation target and operation type condition table.

In step S1108, the extraction module 140 extracts an operation type corresponding to the operation target extracted in step S1102 from an operation type column 1220 of an operation target and operation type condition table 1200. The operation target and operation type condition table 1200 is stored on the extraction module 140. FIG. 12 illustrates a data structure of the operation target and operation type condition table 1200. The operation target and operation type condition table 1200 includes operation target column 1210 and operation type column 1220. The operation target column 1210 lists a document as an operation target (document identification information). The operation type column 1220 lists an operation type. The operation type is a condition according to which an earlier operator is notified of an operation if the operation is performed on the same document (stored on the operation target column 1210) by a later operator after the earlier operator performs the operation of the operation type on the document.

In step S1110, the extraction module 140 determines whether the operation types extracted in steps S1106 and S1108 are identical to each other. If the operation types are identical to each other, processing proceeds to step S1112. If not, processing proceeds to step S1114.

In step S1112, the extraction module 140 sets the operator extracted in step S1104 to be an operator serving as a notification destination.

In step S1114, the extraction module 140 sets the operator extracted in step S1104 not to be an operator serving as a notification destination.

In the flowchart of FIG. 11, the operation type column 1120 of the operation target and operation type condition table 1200 is a condition on a preceding operation. Alternatively, the operation type column 1220 may be a condition on a subsequent operation. In such a case, step S1106 becomes unnecessary. In step S1110, the extraction module 140 determines whether the operation type of the operation (a subsequent operation) detected by the operation detector module 120 is identical to the operation type extracted in step S1108. If the operation types are identical, processing proceeds to step S1112. If not, processing proceeds to step S1114.

Figure 13:
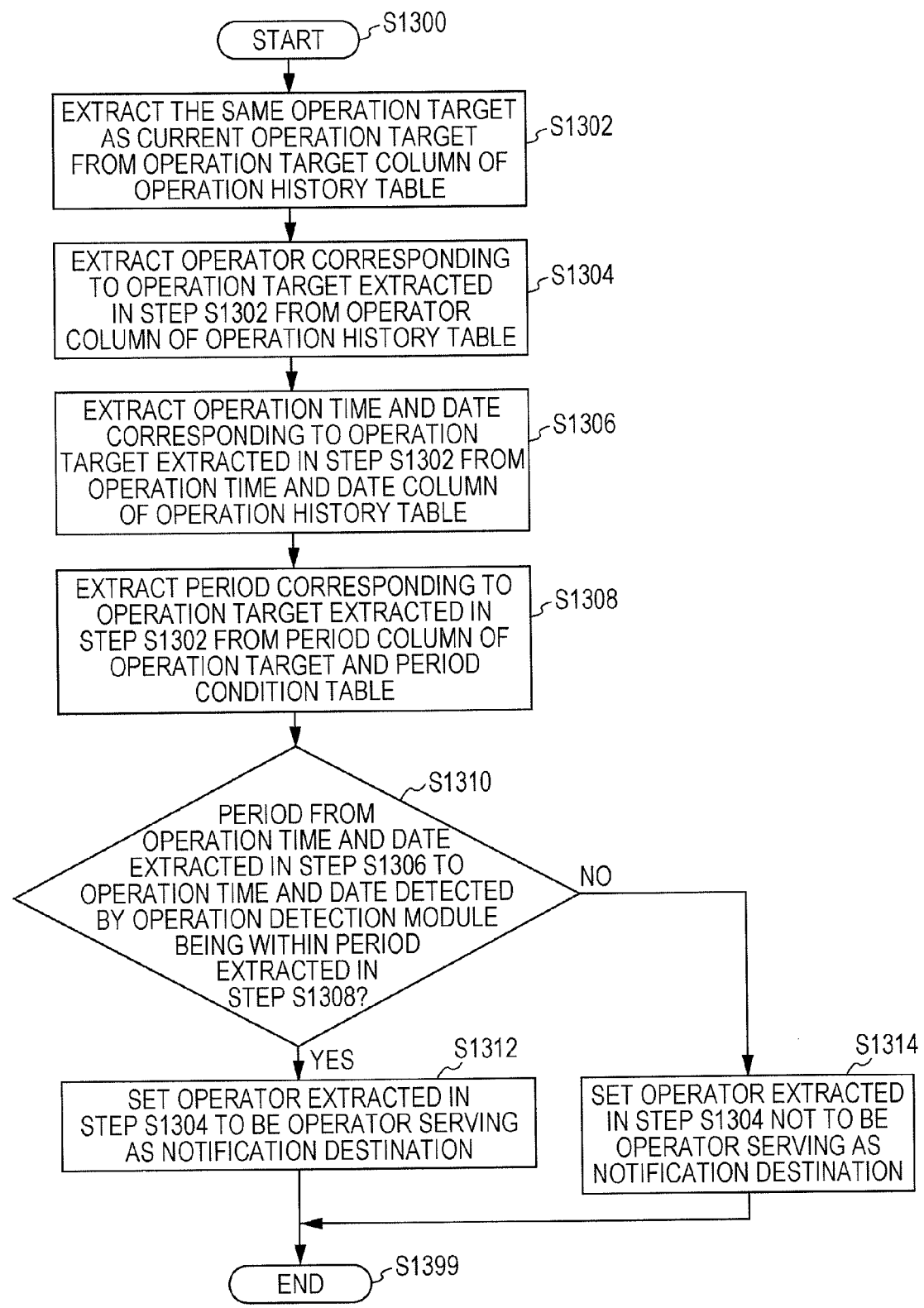
FIG. 13 is a fifth flowchart of the process for extracting the operator as the notification destination.

FIG. 13 is a fifth flowchart of a process for extracting an operator as a notification destination. The fifth flowchart of FIG. 13 is a detailed description of step S308 in the flowchart of FIG. 3 performed by the extraction module 140.

Operations in steps S1302 and S1304 are respectively identical to those in steps S602 and S604 in the flowchart of FIG. 6.

An operation in step S1306 is identical to the operation in step S906 in the flowchart of FIG. 9.

In step S1308, the extraction module 140 extracts a period corresponding to the operation target extracted in step S1302 from a period column 1420 of an operation target and period condition table 1400. The operation target and period condition table 1400 is stored on the extraction module 140. FIG. 14 illustrates a data structure of the operation target and period condition table 1400. The operation target and period condition table 1400 includes operation target column 1410 and period column 1420. The operation target column 1410 lists a document as an operation target (document identification information). The period column 1420 lists a period. The period is a condition according to which an earlier operator is notified of an operation if the operation is performed on the same document (stored on the operation target column 1410) by a later operator within that period from an operation performed by the earlier operator.

In step S1310, the extraction module 140 determines whether a period from an operation time and date extracted in step S1306 to an operation time and date detected by the operation detector module 120 is within the period extracted in step S1308. If the period is within the period extracted in step S1308, processing proceeds to step S1312. If not, processing proceeds to step S1314.

In step S1312, the extraction module 140 sets the operator extracted in step S1304 to be an operator serving as a notification destination.

In step S1314, the extraction module 140 sets the operator extracted in step S1304 not to be an operator serving as a notification destination.

Used in the process of the flowchart of FIG. 13 is the operation target and period condition table 1400 storing a document as an operation target and a period mapped to the document. Alternatively, a table storing the document as an operation target and a period for each operation type mapped to the document may be used. In step S1308 in such a case, the extraction module 140 extracts the operation type corresponding to the operation target extracted in step S1302 from the operation type column 410 of the operation history table 400, and extracts the period for the operation type corresponding to the operator extracted in step S1304 from the operation history table 400.

Figure 16:
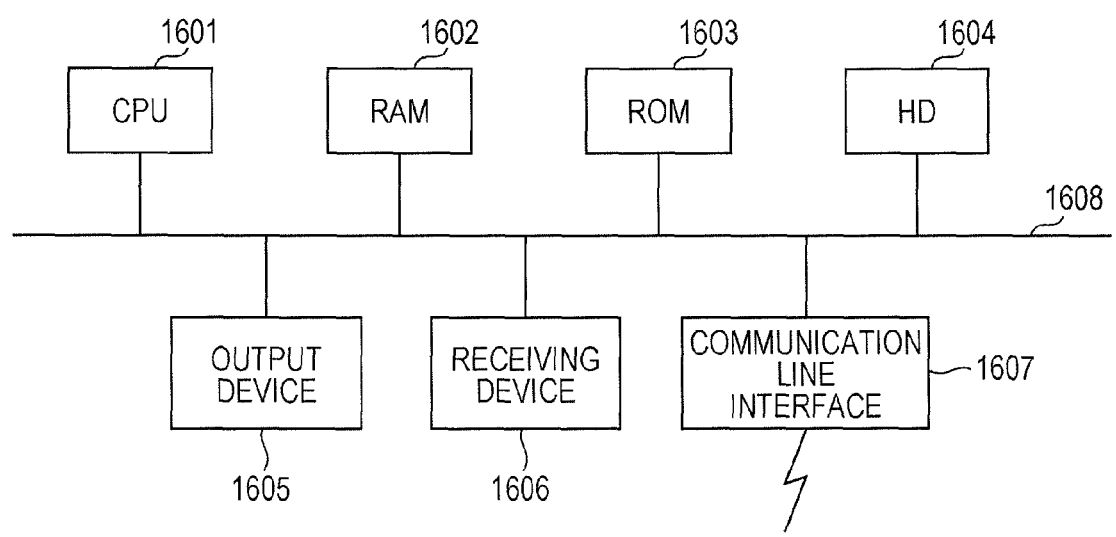
FIG. 16 is a block diagram of a hardware configuration of a computer implementing the exemplary embodiment.

A hardware structure of a computer (each of the information processing apparatus 100, the user terminal 210, and the document DB 220) executing a program as the exemplary embodiment is illustrated in FIG. 16. Specifically, the computer may be a personal computer or a server. The computer may include as a processor a central processing unit (CPU) 1601, and, as memory devices, a random-access memory (RAM) 1602, a read-only memory (ROM) 1603, and a hard disk (HD) 1604. The CPU 1601 executes programs including the document operation module 110, the operation detector module 120, the history memory control module 130, the extraction module 140, and the notification module 150. The computer thus includes the CPU 1601, the RAM 1602 storing the data and the program, the ROM 1603 storing a program starting the computer, and the HD 1604 as an auxiliary memory device. The computer further includes a receiving device 1606 receiving data in response to an operation performed on a keyboard, a mouse, or a touchpanel by a user, an image output device 1605 such as a cathode ray tube (CRT) or a liquid-crystal display (LCD), a communication line interface 1607 such as a network interface card for connection with a communication network, and a bus 1608 interconnecting these elements for data exchange. Multiple computers may be connected via a network.

A software computer program as the exemplary embodiment may be read onto a hardware structure system and then executed with the hardware structure system in cooperation with software resources. The hardware structure of FIG. 16 is illustrated for example purposes only. The exemplary embodiment is not limited to the structure of FIG. 16. Any structure is acceptable as long as the structure implements the modules described with reference to the exemplary embodiment. For example, one of the modules may be constructed of a particular hardware structure (such as application specific integrated circuit (ASIC)). One of the modules may belong to an external system and may be connected to the system of the exemplary embodiment via a communication line. Multiple systems, each illustrated in FIG. 16, may be interconnected via a communication line such that the systems operate in concert with each other. The system may be incorporated in each of the personal computer, digital home appliance, photocopier, facsimile machine, scanner, printer, complex machine (serving at least two of the scanner, the printer, the photocopier, and the facsimile machine).

In the discussion of the exemplary embodiment, the information is typically a document. The information may be a folder. For example, a folder is referenced by an operator, and a new document may be registered on the folder or a version of a document within the folder may be added. The operator that has referenced the folder may be notified of the new registration or a list of documents with the versions thereof added.

According to the exemplary embodiment, even if the number of operations is one, that operation is a notification target. The notification may be performed on condition that the number of operations is plural. Furthermore, the notification may be performed on condition that the operations are of the predetermined operation type. For example, a document referenced by plural times is considered to have a higher degree of interest to the operator than a document referenced only once. An operator having a value equal to or higher than a predetermined number of "references" is set to be an operator as a notification destination.

In the discussion of the exemplary embodiment, the "reference start" and the "reference end" are set to be two different items in the operation type. Alternatively, the "reference start" and the "reference end" may be set as a "reference." In such a case, the operation time and date column 440 of the operation history table 400 includes an "operation start time and date" column and an "operation end time and date" column.

If the operator detected by the operation detector module 120 is identical to the operator extracted by the extraction module 140 (steps S604, S712, S912, S1112, and S1312), the extraction module 140 may set the operator not to be the operator serving as the notification destination.

The detail process in step S308 of the flowchart of FIG. 3 may be a combination of the processes of FIGS. 6, 7, 9, 11, and 13.

The notification performed by the notification module 150 is via an electronic mail. Another method may be used for notification. For example, the notification may be performed using a blog or a twitter on a per user basis.

If the operation detector module 120 detects an operation, the notification module 150 determines whether the operation by the operator as the notification destination still continues. If the operation by the operator as the notification destination still continues, the notification module 150 notifies the operator by displaying a notification content on an operation screen of the operator as the notification destination. This notification is performed because the operation target may already be modified. In cooperation with the history memory module 135, the notification module 150 may determine whether the operation by the operator as the notification destination continues or not. For example, in the operation history table 400 of FIG. 4, operator Mike references document Doc-00005 when operator Mary has added a version to Doc-00005. A notification that the version addition has been performed on the document is displayed on the operation screen of the PC of operator Mike.

The above-described program may be supplied in a stored state on a recording medium. The program may be provided via a communication network. In such a case, the above-described program may be understood as an invention of a "computer readable recording medium storing the program."

The "computer readable recording medium storing the program" refers to a computer readable recording medium storing the program, and used to install the program, to execute the program, or to distribute the program.

The recording media include digital versatile disc (DVD), compact disc (CD), Blu-ray disc (registered trademark), magnetooptical disc (MO), flexible disc (FD), magnetic tape, hard disk, read-only memory (ROM), electronically erasable and programmable read-only memory (EEPROM (registered trademark)), flash memory, and random-access memory (RAM). The DVDs include "DVD-R, DVD-RW, and DVD-RAM" complying with the standard formulated by the DVD forum, and "DVD+R and DVD+RW" complying with DVD+

RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired networks include a local-area network (LAN), a metropolitan-area network (MAN), a wide-area network (WAN), the Internet, an intranet, and an extranet. The program in whole or in part may be transmitted over a carrier wave.

The program may be part of another program, or may be stored on the recording medium together with another program. The program may be split and split programs may then be stored on the recording medium. The program may be processed in any fashion before being stored. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    an operation detector that detects an operation performed on information;
    a history memory controller that controls a history memory to store history information comprising a first operator and information on an operation target of the operation detected by the operation detector, in a mapped state if the operation detector detects the operation;
    an extractor that extracts, from the history memory, a second operator that previously performed another operation on the information if the operation detector detects the operation; and
    a notifier that notifies the second operator that the operation has been performed on the information.

2. The information processing apparatus according to claim 1, wherein the history memory controller controls the history memory to further store, as the history information, information about an operation time corresponding to the operation detected by the operation detector; and
    wherein the extractor only extracts the second operator if an operation time of the other operation previously performed on the information by the second operator is greater than a predetermined value.

3. The information processing apparatus according to claim 1, wherein history memory controller controls the history memory to further store, as the history information, an operation type or an operation time and date corresponding to the operation detected by the operation detector; and
    wherein the extractor extracts the second operator as a notification destination if an operation type of the other operation previously performed on the information by the second operator is a same operation type as the operation type corresponding to the operation detected by the operation detector or if the operation time and date corresponding to the operation detected by the operation detector is within a period of a predetermined operation time and date of the other operation previously performed on the information by the second operator.

4. The information processing apparatus according to claim 2, wherein history memory controller controls the history memory to further store, as the history information, an operation type or an operation time and date corresponding to the operation detected by the operation detector; and
    wherein the extractor extracts the second operator as a notification destination if an operation type of the other operation previously performed on the information by the second operator is a same operation type as the operation type corresponding to the operation detected by the operation detector or if the operation time and date corresponding to the operation detected by the operation detector is within a period of a predetermined operation time and date of the other operation previously performed on the information by the second operator.

5. The information processing apparatus according to claim 3, wherein the extractor extracts the second operator as the notification destination if the operation type of the other operation previously performed on the information by the second operator is a same operation type as the operation type corresponding to the operation detected by the operation detector and an operation target of the other operation previously performed on the information by the second operator is a same operation target as the operation target of the operation detected by the operation detector or if the operation time and date corresponding to the operation detected by the operation detector is within a period of the predetermined operation time and date of the other operation previously performed on the information by the second operator.

6. The information processing apparatus according to claim 4, wherein the extractor extracts the second operator as the notification destination if the operation type of the other operation previously performed on the information by the second operator is a same operation type as the operation type corresponding to the operation detected by the operation detector and an operation target of the other operation previously performed on the information by the second operator is a same operation target as the operation target of the operation detected by the operation detector or if the operation time and date corresponding to the operation detected by the operation detector is within a period of the predetermined operation time and date of the other operation previously performed on the information by the second operator.

7. The information processing apparatus according to claim 3, wherein the extractor extracts the second operator as the notification destination in accordance with predetermined notification-free information indicating whether a notification for the operation performed on the information is necessary or not.

8. The information processing apparatus according to claim 4, wherein the extractor extracts the second operator as the notification destination in accordance with predetermined notification-free information indicating whether a notification for the operation performed on the information is necessary or not.

9. The information processing apparatus according to claim 5, wherein the extractor extracts the second operator as the notification destination in accordance with predetermined notification-free information indicating whether a notification for the operation performed on the information is necessary or not.

10. The information processing apparatus according to claim 6, wherein the extractor extracts the second operator as the notification destination in accordance with predetermined notification-free information indicating whether a notification for the operation performed on the information is necessary or not.

11. The information processing apparatus according to claim 3, wherein the period of the predetermined operation time and date is set according to the operation type of the other operation previously performed on the information by the second operator.

12. The information processing apparatus according to claim 4, wherein the period of the predetermined operation time and date is set according to the operation type of the other operation previously performed on the information by the second operator.

13. The information processing apparatus according to claim 5, wherein the period of the predetermined operation time and date is set according to the operation type of the other operation previously performed on the information by the second operator.

14. The information processing apparatus according to claim 6, wherein the period of the predetermined operation time and date is set according to the operation type of the other operation previously performed on the information by the second operator.

15. The information processing apparatus according to claim 7, wherein the period of the predetermined operation time and date is set according to the operation type of the other operation previously performed on the information by the second operator.

16. The information processing apparatus according to claim 8, wherein the period of the predetermined operation time and date is set according to the operation type of the other operation previously performed on the information by the second operator.

17. The information processing apparatus according to claim 9, wherein the period of the predetermined operation time and date is set according to the operation type of the other operation previously performed on the information by the second operator.

18. The information processing apparatus according to claim 10, wherein the period of the predetermined operation time and date is set according to the operation type of the other operation previously performed on the information by the second operator.

19. An information processing method, comprising:
detecting an operation performed on information;
controlling a history memory to store history information comprising a first operator and information on an operation target of the operation detected by the operation detector, in a mapped state if the operation is detected;
extracting from the history memory a second operator that previously performed another operation on the information if the operation is detected; and
notifying the second operator that the operation has been performed on the information.

20. A non-transitory computer readable medium storing a program causing a computer to execute a process for processing information, the process comprising:
detecting an operation performed on information;
controlling a history memory to store history information comprising a first operator and information on an operation target of the operation detected by the operation detector, in a mapped state if the operation is detected;
extracting from the history memory a second operator that previously performed another operation on the information if the operation is detected; and
notifying the second operator that the operation has been performed on the information.

* * * * *